Oct. 30, 1956

F. MUHLENBRUCH 2,768,732

EXTENSIBLE LOADING CONVEYOR

Filed Jan. 3, 1955

INVENTOR
FRED MUHLENBRUCH.

BY Percy Freeman
ATTORNEY

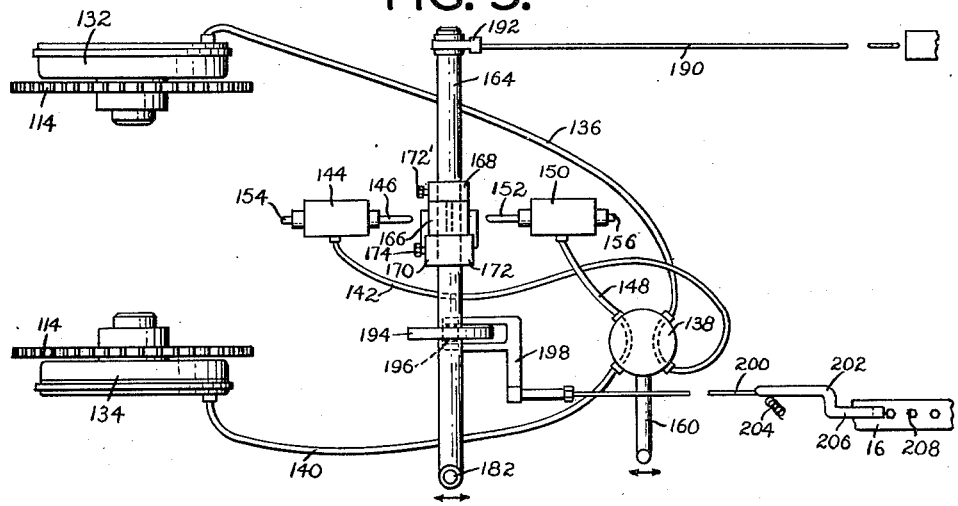
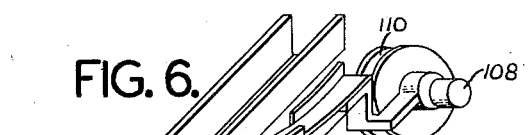
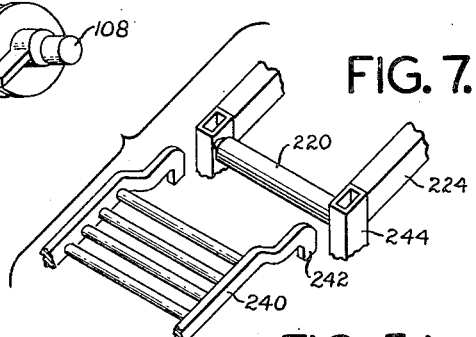
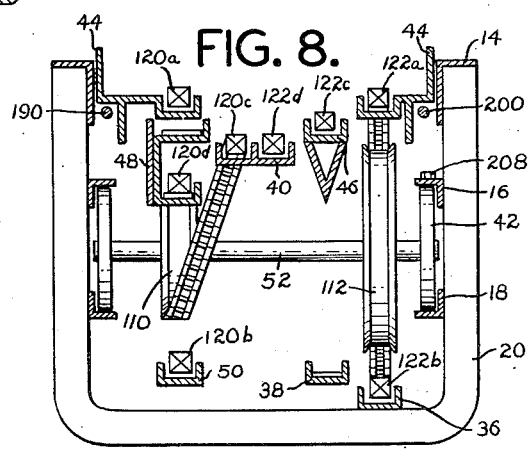
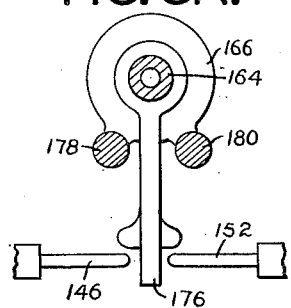
INVENTOR
FRED MUHLENBRUCH.

INVENTOR
FRED MUHLENBRUCH.
ATTORNEY

2,768,732

EXTENSIBLE LOADING CONVEYOR

Fred Muhlenbruch, Flushing, N. Y., assignor to Dairy Conveyor Corporation, College Point, N. Y., a corporation of New York Application January 3, 1955, Serial No. 479,458

8 Claims. (Cl. 198—139)

This invention relates to an extensible and contractable loading and unloading conveyor.

The principal object of this invention is the provision of a conveyor which may quickly and easily be extended to increase its operative length or contracted to decrease its operative length. It is particularly useful in loading and unloading large motor trucks and freight cars and the like. One end of the conveyor would be situated on or adjacent a loading platform. The other end would project into the body of the truck or other vehicle. Assuming that the task is to load the truck, the forward end of said conveyor would be projected to the forward end of the body of the truck and as the truck is loaded from front to rear, the conveyor would be retracted so that its delivery station would always correspond to the loading location in the truck. By the same token, the process or procedure would be reversed on unloading the truck. As the truck is unloaded progressively from its back end to its front end, the conveyor would be extended to keep pace therewith so that its receiving end would always coincide with the unloading station on the truck.

Extensible conveyors are known to the prior art but in all cases known to applicants the mechanism employed to extend and retract the conveyor has been complicated and cumbersome and difficult to operate. There would be one mechanism to operate the conveyor proper and another mechanism to extend and retract the conveyor. In some cases the two mechanisms would tend to conflict or interfere with each other and it would be necessary to stop one mechanism in order to put the other mechanisms into operation.

In the present invention, there is only a single conveyor driving mechanism. This mechanism drives the conveyor in either direction, depending upon how it it set. A reversible motor may be provided or reversible gears or any other conventional direction changing power source or transmission. Brakes are provided on the conveyor and depending upon which brake is actuated and the direction of travel of the conveyor, the conveyor will either extend in length or contract and there would be no interruption of the operation of the mechanism.

More specifically, the conveyor has two endless chains which are situated side by side in substantial parallel relation to each other, the upper runs of the two chains occupying a common, generally horizontal plane. Each endless chain is looped around a series of four sprockets and pulleys, two on a fixed or stationary frame and two on a frame which is longitudinally movable relative to the fixed frame. In the normal course of events, with the frames held in fixed relation to each other, the conveyor chains will travel in one direction or the other depending upon the direction of operation of the drive mechanism.

When it is desired to project the conveyor forwardly, what is actually done is to move the movable frame forwardly and conversely, when it is desired to retract the conveyor, the movable frame is moved rearwardly.

This is accomplished in the following manner and without interrupting the travel of the conveyor chains. Each conveyor chain is looped around a forward sprocket and a rear pulley mounted on the movable frame and around a forward pulley and a rear sprocket mounted on the fixed frame which occupies a rear position relative to the movable frame. The front pulley on the fixed frame is situated between the front sprocket and rear pulley on the movable frame. There is a brake on the forward sprocket of the movable frame. When the brake is applied to said forward sprocket, relative movement between the chain on said sprocket and the sprocket ceases. It is no longer possible for the rear pulley on the movable frame to draw the conveyor chain from said forward sprocket. By the same token, it is no longer possible for the forward pulley on the fixed frame to draw chain from the rear pulley on the movable frame. And finally, it is no longer possible for the rear sprocket on the fixed frame to draw chain from the forward pulley on said fixed frame. But since the rear sprocket on the fixed frame is the power sprocket, and since it continues to rotate, it must obtain its chain in some way and this is accomplished by forcing the rear pulley on the movable frame to move in the direction of the forward pulley on the fixed frame, thereby reducing the length of the runs between the two pulleys and feeding chain to the rear drive sprocket on the fixed frame. This all presupposes that the chain is being moved forwardly in its upper run.

Assuming the converse, namely, that the conveyor is traveling rearwardly in its upper run, and it is desired to extend it forwardly, what is done is to apply the brake to the forward sprocket belonging to the other chain. Once this is done, said front sprocket is no longer able to draw chain from the rear sprocket of the fixed frame and said rear sprocket is no longer able to draw chain from the forward pulley of the fixed frame and said forward pulley is unable to draw chain from the rear pulley of the movable frame. Consequently, since the rear sprocket of the fixed frame continues to rotate, its pull upon the chain simply draws the rear pulley on the movable frame toward the front pulley on the fixed frame and thereby projects the movable frame forwardly. The same procedure takes place when it is desired to retract the movable frame since all that need be done to achieve this result is to apply the brake to one or the other front sprocket depending upon the direction of travel of the conveyor chains.

It appears from the foregoing, that the principle of this mechanism is to translate the longitudinal movement of the conveyor chains into longitudinal movement in either direction of the movable frame, without interrupting the longitudinal movement of the chains. Indeed, if the longitudinal movement of the chains ceased, longitudinal movement of the movable frame could not, under this system, be effectuated. Not only, therefore, does the travel of the conveyor chains not interfere with the longitudinal movement of the movable frame, but it actually is the cause of such longitudinal movement of the movable frame. In short, there is no mechanism for projecting the movable frame forwardly or retracting it rearwardly, which is separate and apart from the very mechanism which operates the conveyor chains and it is simply a matter of shifting the relative positions of the sprockets and pulleys on the two frames by means of the brake mechanisms above mentioned that causes the conveyor to extend or contract.

The invention is illustrated in the accompanying drawing in which:

Fig. 5 is a view of the hydraulic brake mechanism by which the front sprockets may individually be stopped.

Fig. 5A is a view of the valve control mechanism, controlling the flow of hydraulic fluid to the hydraulic brakes.

Fig. 6 is a fragmentary perspective view showing the rear pulley on the movable frame supporting the claim shown in Fig. 3 and showing a floating guide which carries the chain into a supporting channel.

Fig. 7 is a fragmentary, perspective exploded view of the front end of the movable frame and the rear end of an auxiliary conveyor which is engageable therewith.

Fig. 8 is an enlarged transverse section on the line 8—8 of Fig. 2.

Figure 1:
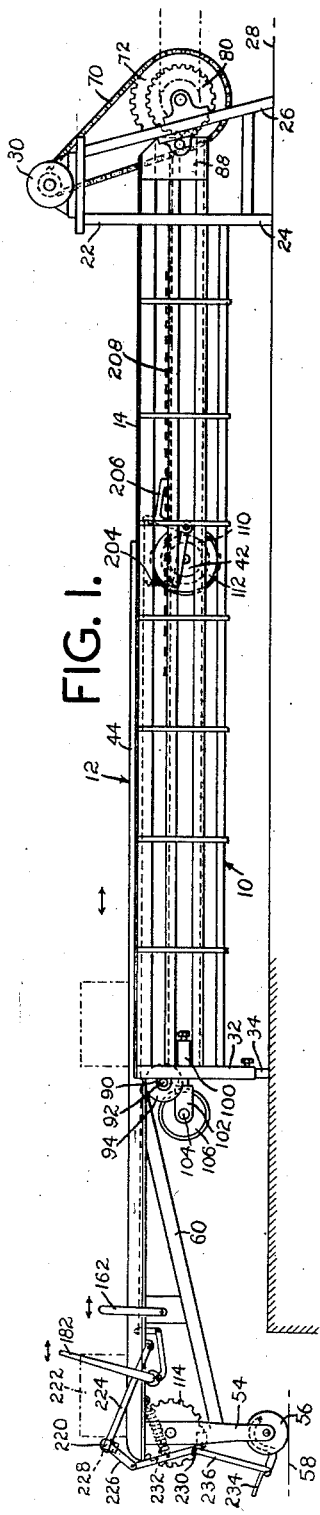
Fig. 1 is a side view of a conveyor made in accordance with this invention.
Figure 2:
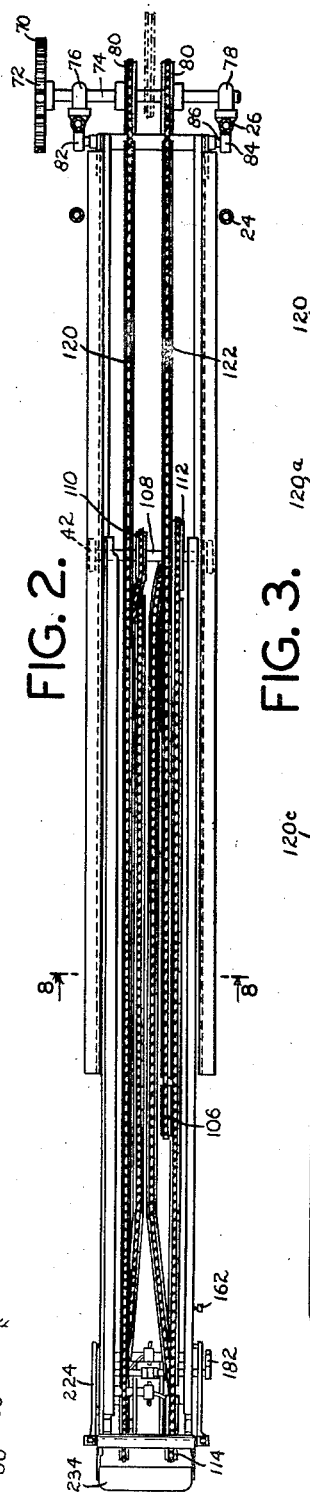
Fig. 2 is a plan view thereof.

The conveyor herein claimed has two frames, a fixed frame 10 and a movable frame 12. The fixed frame comprises a plurality of longitudinally extending rails, namely, angle-shaped rails 14 at the top and intermediate angle-shaped rails 16 and lower angle-shaped rails 18, all secured to a plurality of U-shaped yokes or frame members 20. At the back end of the fixed frame 10 is a supporting structure 22 which includes legs 24 and 26 adapted to support the rear end of the fixed frame on a loading platform 28 or the like. At the top of supporting structure 22 is a reversible, geared-down motor 30 which serves as the motive power or drive mechanism for the conveyor chains. At the forward end of the fixed frame 10 is another supporting structure 32 with adjustable legs 34 adapted to support said forward end of the fixed frame at varying heights or levels above the loading platform 28. Included in the fixed frame 10 are additional longitudinally extending rails, namely, U-shaped rails 36 and 38 and E-shaped rail 40.

Angle rails 16 and 18 of the fixed frame serve as guides or tracks for wheels 42 which support the movable frame 12. Said movable frame also includes a plurality of longitudinally extending rails, namely, upper rails 44, U-shaped rail 46, rail 48 and U-shaped rail 50 below said rail 48. These rails, both of the fixed and movable frames, are best shown in Figs. 8 and 6. It will be understood that wheels 42 are mounted on shaft 52 and that the rear end of the movable frame is mounted on said shaft, whereby said movable frame is longitudinally movable within and relative to the fixed frame. The forward end of the movable frame is supported on legs 54 which are mounted on wheels 56. These wheels 56 are adapted to roll on a truck platform 58 or the like and thereby support the forward end of said movable frame on said truck platform. Diagonal brace 60 connected to the movable frame and to legs 54 supports said legs in vertical position.

Motor 30 is connected by means of a gear chain 70 to a gear wheel 72 mounted on a shaft 74. This shaft 74 is supported by bearings 76 and 78 mounted on legs 26 of supporting structure 22. A pair of sprockets 80 are fixed to shaft 74 so that as the motor operates and causes said shaft to rotate, sprockets 80 will rotate integrally therewith. Sprockets 80 will herein be designated as the rear or drive sprockets on the fixed frame. It will be observed that another set of bearings 82 and 84 are secured to the same legs 26 of supporting structure 22. A shaft 86 is mounted in said bearings 82 and 84 and said shaft supports plates 88 which are fixed to the rear end of the fixed frame. This is the sole connection which the fixed frame has to the supporting structure 22 and it will be understood from this arangement that the fixed frame may be pivoted about the longitudinal axis of shaft 86 to raise or lower its forward end by means of adjustable legs 34 above mentioned. Since the movable frame is mounted within the fixed frame and is free to move with it, shaft 86 is actually the main pivot or fulcrum of the entire conveyor. It should be understood, however, that the movable frame is also pivotally movable relative to the fixed frame about the axis of shaft 52 above mentioned. This is important because it may be necessary to adjust the height of the forward end of the movable frame in addition to adjusting the height of the forward end of the fixed frame. It will now be observed that bearings 90 are provided on the front legs 32 of the fixed frame and that a shaft 92 is journaled into said bearings 90. Supported by shaft 92 is a wheel 94 immediately adjacent diagonal brace 60. When the movable frame is retracted beyond its position shown in Fig. 1, diagonal brace 60 rides up upon wheel 94 to pivot said movable frame relative to the fixed frame and thereby to enable the mechanism on the forward end of the movable frame to clear the forward end of the fixed frame.

At the forward end of fixed frame 10 is a pair of adjustable supports 100 supporting a pair of bearings 102 mounted on said bearings is a shaft 104 which support a pair of pulleys 106. These pulleys will herein be designated as the front pulleys on the fixed frame and they are situated opposite the rear drive sprockets 80 above mentioned. Referring now to the movable frame 12, it will be observed that at its rear end is journaled a shaft 108 corresponding to shaft 74 previously mentioned. Mounted on shaft 108 is a pair of pulleys 110 and 112 respectively and these pulleys will herein be designated as the rear pulleys of the movable frame. At the front end of the movable frame is a pair of sprocket wheels 114 corresponding to sprocket wheels 80 above mentioned and said sprocket wheels 114 will herein be designated as the front sprockets of the movable frame. They are situated opposite pulleys 110 and 112 of the movable frame.

Figure 3:
Fig. 3 is a side view, partly diagrammatic, of one of the endless chains of said conveyor, showing said chain mounted on two sprockets and two pulleys, said chain being the upper chain as viewed in Fig. 2.
Figure 4:
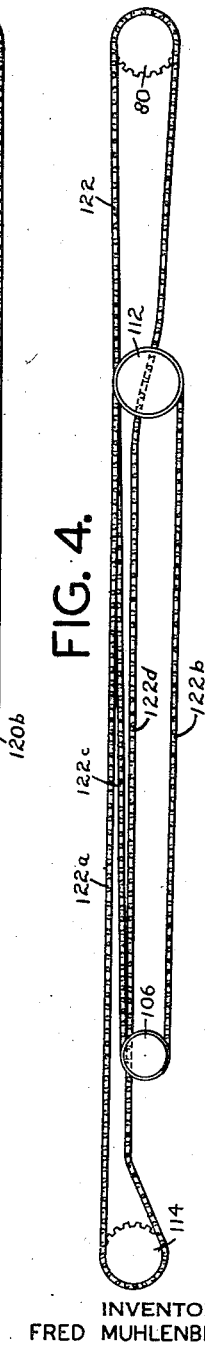
Fig. 4 is a similar view of the other endless chain of the conveyor, being the lower chain as viewed in Fig. 2.

It appears from the foregoing, that there are two rear drive sprockets 80 on the fixed frame and two forward pulleys 106 on the fixed frame and two rear pulleys 110 and 112 on the movable frame and finally two forward sprockets 114 on the movable frame. It will be observed in Fig. 3 that an endless chain 120 is looped around rear pulley 110 of the movable frame and around that rear sprocket 80 which is behind said pulley 110 and also around that pulley 106 and that sprocket 114 which are situated in front of said pulley 110. Similarly, as shown in Fig. 4, there is a second endless chain 122 which is looped around rear pulley 112 of the movable frame and around that sprocket 80 which is situated behind pulley 112 and around that pulley 106 and that sprocket 114 which are situated in front of pulley 112. Endless chain 120 will herein be designated as the right-hand chain of the conveyor and endless chain 122 will herein be designated as the left-hand chain of the conveyor.

It will be observed in Fig. 8 that the upper run 120a of chain 120 is supported by the left-hand channel 44 (as viewed in said Fig. 8) and its lowermost run 120b is supported by channel 50. The upper intermediate run 120c of chain 120 is supported by the E-shaped channel 40 and the lower intermediate run 120d is supported by channel member 48. It will be observed in Fig. 6 that pulley 110 has a floating guide 130 pivotally mounted on shaft 108 which guides the lower intermediate run 120d of chain 120 over to channel 48 from said pulley 110 which is laterally offset from said channel. A similar arrangement is provided in connection with chain 122. It will be seen in Fig. 8, that the upper run 122a of said latter chain is supported by channel 44 which is situated on the right side of Fig. 8. The lowermost run 122b is supported by channel 36. The upper intermediate run 122c is supported by channel 46 and the lower intermediate run 122d is supported by E-shaped channel 40.

Connected to the forward sprockets 114 of the movable frame are hydraulic brake mechanisms 132 and 134 respectively. A hose 136 connects brake 132 to a four-way valve 138. A second hose 140 connects brake 134 to said four-way valve 138. A third hose 142 connects the four-way valve to a cylinder 144 which has a valve mechanism controlled by a rod 146. A fourth hose 148 connects the four-way valve to a second cylinder 150 which has a valve mechanism controlled by a rod 152. A pair of hose members 154 and 156 connect the two cylinders 144 and 150 to a source of hydraulic fluid under pressure. The function of the four-way valve 138 is to cause either of the two hose members 142 and 148 to communicate with either of the two hose members 136 and 140, thereby providing communication between either of the valve cylinders 144 and 150 with either of the hydraulic brakes 132 and 134.

A shaft 160 is connected to the four-way valve 138 and a handle 162 is connected to said shaft. Handle 162 may be actuated manually to operate the four-way valve and thereby to connect either of the two valve cylinders 144 and 150 with either of the two brakes 132 and 134. A second shaft 164 is mounted between and above the two valve cylinders 144 and 150. A collar 166 is freely mounted on shaft 164 between two additional collars 168 and 170 respectively. These two additional collars are adjustably secured to the shaft by means of set screws 172 and 174 respectively. Projecting downwardly from collar 166 is an arm 176 positioned for engagement with rods 146 and 152 of the two valve cylinders 144 and 150. It will be observed that secured to fixed collar 172 is a pair of arms 178 and 180 respectively on opposite sides of arm 176. A handle 182 is secured to shaft 164 and when said handle is actuated to turn the shaft, arms 178 and 180 are brought into engagement with arm 176, arm 178 when the shaft is turned in counterclockwise direction as viewed in Fig. 5A, and arm 180 when said shaft is turned in clockwise direction as viewed in the same Fig. 5A. It is in this manner and by this means that either of the two brakes 132 and 134 may be applied to prevent either of the two front sprockets 114 from rotating. It will be understood that the relationship between the four-way valve 138 controlled by handle 162 and the two valve cylinders 144 and 150 controlled by handle 182 is as follows: It is desired to extend the conveyor by pushing handle 182 leftwardly as viewed in Fig. 1, irrespective of the direction of movement of the conveyor chains and it is likewise desired to contract the conveyor by moving said handle rightwardly, irrespective of the direction of movement of the conveyor chains. It will shortly become apparent that to extend the conveyor, when the chains are traveling in one direction, one of said brakes is to be applied, and to extend the conveyor when the chains are traveling in the opposite direction, the other of said brakes is to be applied. Similarly, when it is desired to retract the conveyor while the chains are traveling in one direction, one of said brakes is to be applied and to accomplish the same result when the chains are traveling in the opopsite direction, the other brake is to be applied. Consequently, if it is desired to extend the conveyor by moving handle 182 forwardly irrespective of the direction of travel of the chains, and also to retract the conveyor by moving said handle rearwardly, irrespective of the direction of travel of the chains, said four-way valve is required.

There are two automatic controls on shaft 164 and these controls are shown in Fig. 5. There is a rod 190 attached to an offset arm 192 on shaft 164. When the movable frame is retracted, rod 190 will engage the fixed frame at such time as full or complete retraction takes place, and acting through arm 192, it will cause shaft 164 to turn until its arm 176 is out of engagement with rod 146 which it had to engage in order to retract the conveyor. In addition to this control there is a cam 194 on shaft 164 which is engageable with a cam follower 196. This cam follower is mounted on a pivoted arm 198 which is in the nature of a bell crank. This bell crank 198 is connected by means of a cable 200 to a second bell crank 202 which is urged in clockwise direction, as viewed in Fig. 1, by a spring 204. Bell crank 202 is provided with an arm 206 which is engageable with lugs or bolt heads 208 on rail 16. See Figs. 1 and 8. When handle 182 is released, spring 204 will act to engage arm 206 with lugs 208. When handle 182 is actuated, however, cam 194 on shaft 164 will act upon cam follower 196 to pivot bell crank 198 and thereby to pull upon cable 200 and to disengage arm 206 from lugs 208.

Figure 9:
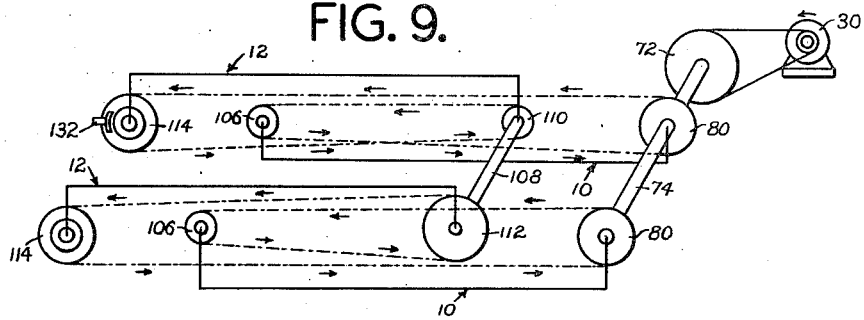
Fig. 9 is a diagrammatic view showing the fixed and movable frames and the sprockets and pulleys on said frames and the chains on said sprockets and pulleys and showing the brake applied to the forward sprocket supporting one of said chains, to extend the conveyor.
Figure 10:
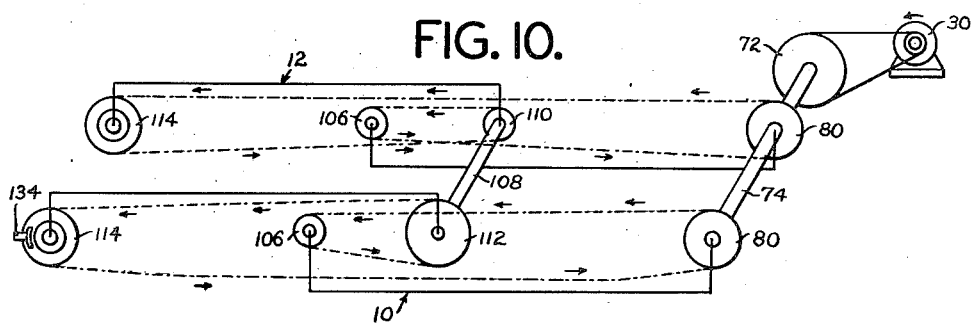
Fig. 10 is a similar view showing the conveyor in extended position and the brake applied to the front sprocket supporting the other of said chains, to retract the conveyor.

The principle of this mechanism has above been described. In order to drive the conveyor chains in one direction, reversible motor 30 is caused to rotate in one direction and when it is desired that the conveyor chains travel in the opposite direction, said reversible motor is caused to operate in the opposite direction. See Figs. 9 and 10 on the one hand and Figs. 11 and 12 on the other hand. In Figs. 9 and 10 the chains are traveling in a forward direction, that is, their upper runs 120 and 122a are traveling forwardly or leftwardly as viewed in said Figs. 9 and 10. In order to extend the conveyor by moving the movable frame forwardly (leftwardly), brake 132 is applied. This stops the chain from moving from the right hand sprocket 114 (upper sprocket 114 as viewed in Fig. 9) around the two pulleys shown in Fig. 3 and to drive sprocket 80 shown in Fig. 3. But since said drive sprocket continually rotates, it must get its chain from some source and what happens is that pulley 110 is pulled toward pulley 106 in order to feed chain to said drive sprocket 80. This causes the movable frame to move forwardly from its Fig. 9 position to its Fig. 10 position or to any other advanced position.

Figure 11:
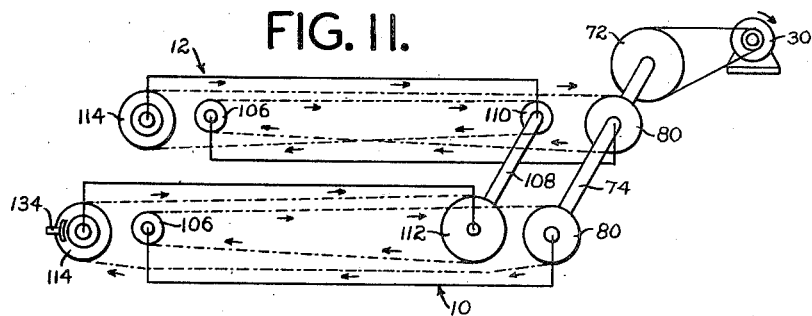
Fig. 11 is still another similar view showing the same brake applied as in Fig. 10 but for the purpose of extending the conveyor since in this case the conveyor chains are traveling in the opposite direction from their travel in Figs. 9 and 10.
Figure 12:
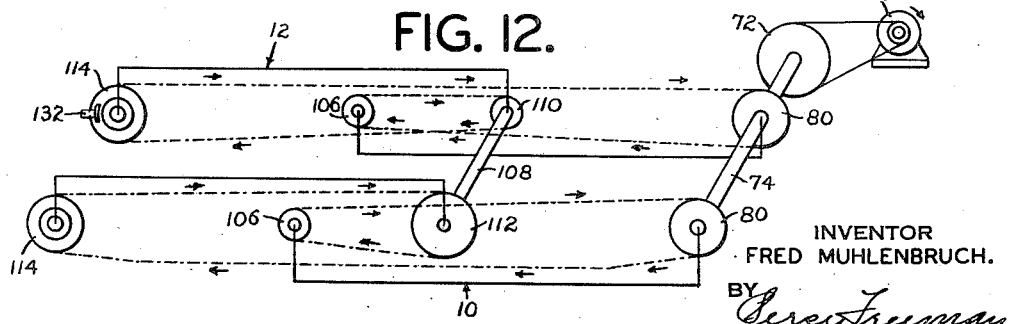
Fig. 12 is still another diagrammatic view showing the conveyor in extended position, the conveyor chains moving in the same direction as in Fig. 11, and the same brake being applied as in Fig. 9, to retract the conveyor.

In order to retract the conveyor, brake 134 is applied to the left hand sprocket 114 (lower sprocket 114) shown in Fig. 10. Again, this prevents drive sprocket 80 from receiving chain in the usual manner and it obtains its chain by simply pulling upon said sprocket 114 and drawing it closer to the fixed frame. This has the effect of retracting the conveyor. In Fig. 11 and Fig. 12 the conveyor chains are traveling in the opposite direction and to extend the conveyor from its Fig. 11 position to its Fig. 12 position or any other advanced position, brake 134 is applied. Conversely, when it is desired to retract the conveyor from its Fig. 12 position to its Fig. 11 position, brake 132 is applied.

The conveyor herein claimed may be provided at its forward end with a stop roller 220 to stop the packages or cases 222 and to prevent them from falling off said conveyor. Roller 220 is mounted on pivoted arms 224 and a linkage 226 is connected to shaft 228 on which said stop roller is mounted in order to pull said roller out of the way. This linkage 226 is connected by means of pivotal connection 230 to the front legs 54 of the movable frame. A spring 232 tends to pull the linkage in clockwise direction as viewed in Fig. 1 in order to elevate the stop roller 220 to its operative position. A foot treadle 234 is pivoted to the bottom of legs 54 and it is connected by means of bars 236 to linkage 226, whereby said linkage may be pulled downwardly against the action of spring 232 in order to clear the packages or cases 222. In Fig. 7 is shown an extension conveyor 240 having hook-shaped ends 242. These hook-shaped ends are adapted to engage tubular members 244 on arms 224 and thereby to support said extension conveyor in operative position relative to the conveyor herein claimed. The weight of extension conveyor 240 pulls arms 224 downwardly and causes the stop roller 220 to clear the packages or cases 222.

The foregoing is illustrative of a preferred form of this invention and it will be understood that this preferred form may be modified and other forms may be had within the broad spirit of the invention and the broad scope of the claims.

What is claimed is:

1. An extensible conveyor comprising a stationary frame and a movable frame which is movably connected to the stationary frame for longitudinal movement relative thereto in either direction, said stationary frame having a first and a second drive sprocket mounted thereon at one end thereof, a first and a second pulley mounted on said stationary frame at the opposite end thereof, said movable frame having a first and a second driven sprocket mounted thereon at one end thereof, a first and a second pulley mounted on said movable frame at the opposite end thereof, a first endless conveyor chain extending around said first drive sprocket, said first driven sprocket, said first pulley on the movable frame, and said first pulley on the fixed frame; a second endless conveyor chain extending around said second drive sprocket, said second pulley on the fixed frame, said second pulley on the movable frame, and said second driven sprocket; motive means for driving the sprocket chains in both directions selectively; a brake for said first driven sprocket, a brake for said second driven sprocket, means for selectively actuating said brakes to effect selectively extension and retraction of said movable frame relative to said stationary frame, regardless of the direction of travel of said sprocket chains.

2. An extensible conveyor in accordance with claim 1, wherein the drive sprockets on the stationary frame are mounted at the back end thereof and the sprockets on the movable frame are mounted at the forward end thereof, the pulleys on the movable frame being mounted at the back end thereof, the pulleys on the stationary frame being mounted at the forward end thereof between the sprockets and pulleys of the movable frame.

3. An extensible conveyor in accordance with claim 1, wherein the brakes which are engageable with the sprockets on the movable frame are hydraulic brakes, a four-way control valve connected to said brakes, a pair of control valves connected to a source of hydraulic fluid under pressure and to said four-way control valve, and actuating means for manually operating the four-way control valve and additional actuating means for manually operating the other two control valves selectively.

4. An extensible conveyor in accordance with claim 1, wherein the brakes which are engageable with the sprockets on the movable frame are hydraulic brakes, control valves being connected to said brakes to control the flow of hydraulic fluid thereto, and actuating means for selectively actuating said control valves and thereby selectively energizing said brakes.

5. An extensible conveyor in accordance with claim 1, wherein the brakes are hydraulically controlled, one control valve being connected to said brakes and a pair of control valves being connected to said first control valve, said pair of control valves being manually actuated to control the flow of hydraulic fluid to the first control valve and said first control valve being manually actuated to control the flow of hydraulic fluid to said brakes, said first control valve being adapted to selectively control the flow of said hydraulic fluid from either of said pair of control valves to either of said brakes.

6. An extensible conveyor in accordance with claim 1, wherein the back end of the movable frame is pivotally connected to the stationary frame about a transverse axis, whereby the movable frame is adapted to pivot in a vertical plane about said transverse axis relative to the stationary frame.

7. An extensible conveyor in accordance with claim 1, wherein the stationary frame is provided with longitudinally extending channels, the rear end of the movable frame being provided with wheels which ride in said longitudinally extending channels, said wheels being mounted on a transverse shaft, whereby the movable frame is pivotally movable relative to the stationary frame about the axis of said shaft in addition to being longitudinally movable relative to said stationary frame.

8. An extensible conveyor in accordance with claim 1, wherein the movable frame is pivotally connected to the stationary frame about a transverse axis situated at the rear end of said movable frame, the forward end of the stationary frame being mounted on vertically adjustable legs and the forward end of the movable frame being also mounted on vertically adjustable legs, whereby the angular relationship of the two frames about the axis of said shaft may be varied.

References Cited in the file of this patent

UNITED STATES PATENTS

| | | |
|---|---|---|
| 1,937,925 | Tolf | Dec. 5, 1933 |
| 2,491,255 | Edwards | Dec. 13, 1949 |